United States Patent
Neuner, III et al.

(10) Patent No.: US 9,647,771 B2
(45) Date of Patent: May 9, 2017

(54) WAVELENGTH OPTIMIZATION FOR UNDERWATER OPTICAL COMMUNICATIONS

(71) Applicants: Burton H. Neuner, III, San Diego, CA (US); Alexandru Hening, San Diego, CA (US); Bienvenido Melvin Pascoguin, La Mesa, CA (US)

(72) Inventors: Burton H. Neuner, III, San Diego, CA (US); Alexandru Hening, San Diego, CA (US); Bienvenido Melvin Pascoguin, La Mesa, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/083,563

(22) Filed: Mar. 29, 2016

(65) Prior Publication Data
US 2017/0093502 A1    Mar. 30, 2017

Related U.S. Application Data

(63) Continuation-in-part of application No. 14/870,480, filed on Sep. 30, 2015.

(51) Int. Cl.
*H04B 10/00* (2013.01)
*H04B 10/80* (2013.01)
(Continued)

(52) U.S. Cl.
CPC ........... *H04B 10/80* (2013.01); *H01S 3/0078* (2013.01); *H01S 3/2391* (2013.01); *H04B 10/503* (2013.01)

(58) Field of Classification Search
CPC .............................. H04B 10/80; H04B 10/572
See application file for complete search history.

(56) References Cited

U.S. PATENT DOCUMENTS 7,068,362 B2 * 6/2006 Murdock ............. G01N 21/538
                                                   356/218
8,750,727 B1 * 6/2014 Hiller .................... H04B 13/02
                                                   398/118
(Continued)

OTHER PUBLICATIONS

Mullen, Linda et al., Backscatter Suppression For Underwater Modulating Retroreflector Links Using Polarization Discrimination, Applied Optics 10, Jan 2009, vol. 48, No. 2.
(Continued)

*Primary Examiner* — Danny Leung
(74) *Attorney, Agent, or Firm* — SSC Pacific Patent Office; Arthur K. Samora; Kyle Eppele

(57) ABSTRACT

Systems and methods for wavelength optimization for underwater optical communication can include a plurality of n lasers having different wavelengths $\lambda_i$ for i=1 to n, a beam splitter and a corner retro-reflector. The plurality of n lasers can simultaneously illuminate the beam splitter along a coincident axis. The plurality of n lasers can be selectively blocked so that only one laser wavelength $\lambda_i$ at a time impinges on the beam splitter. A portion passes through the beam splitter to establish a reference signal, while the remainder is reflected off the corner retro-reflector. A portion of return illumination passes through the beam splitter to establish a return signal. The process can be repeated for each of n lasers for i=1 to n. The $\lambda_i$ wavelength where the normalized signal-to-noise differential between the reference signal and return signal is the minimum can be the optimum communication wavelength.

20 Claims, 3 Drawing Sheets

(51) Int. Cl.
  *H01S 3/23* (2006.01)
  *H01S 3/00* (2006.01)
  *H04B 10/50* (2013.01)

(56) References Cited

U.S. PATENT DOCUMENTS

| | | | | |
|---|---|---|---|---|
| 9,031,413 | B2* | 5/2015 | Doniec | H04B 13/02 398/104 |
| 2003/0203371 | A1* | 10/2003 | Corson | B01J 19/0046 435/6.11 |
| 2004/0030519 | A1* | 2/2004 | Messina | G01B 11/272 702/94 |
| 2006/0222043 | A1* | 10/2006 | Cahill | G01N 25/18 374/44 |
| 2007/0284516 | A1* | 12/2007 | Bustamante | G02B 21/32 250/251 |
| 2008/0205892 | A1* | 8/2008 | Baiden | H04B 13/02 398/104 |
| 2008/0297311 | A1* | 12/2008 | Wu | G06Q 20/20 340/10.1 |
| 2010/0274501 | A1* | 10/2010 | Rekenthaler | G01N 21/31 702/28 |
| 2012/0050520 | A1* | 3/2012 | Thoren | G02B 23/22 348/81 |
| 2012/0268746 | A1* | 10/2012 | Wysocki | G01N 21/45 356/517 |
| 2014/0196745 | A1* | 7/2014 | Whelan | B63B 59/04 134/1 |
| 2014/0341584 | A1* | 11/2014 | Hopewell | H04B 10/80 398/104 |
| 2015/0219765 | A1* | 8/2015 | Mead | H01S 3/06754 356/5.09 |
| 2016/0137276 | A1* | 5/2016 | Salters | B08B 17/02 114/222 |

OTHER PUBLICATIONS

Paschotta, Rudinger, Spectral Beam Combining, Encyclopedia of Laser Physics and Technology, www.rp-photonics.com/spectral_beam_combining.html, Mar. 18, 2016.

Neuner, Burton H. III et al., A Novel Method To Optimize The Wavelength For Underwater Free-Space Optical Communications, Proceeding of SPIE vol. 9224, 922417-1 (2014).

Neuner, Burton H. III et al., Wavelength Optimization via Retroreflection for Underwater Free-Space Optical Communication, Proceeding of SPIE vol. 9467, 946724-1 (2015).

Leger, J.R. et al., Coherent Laser Beam Addition: An Application of Binary-Optics Technology, The Lincoln Laboratory Journal, vol. 1, No. 2, 1988.

Stanton, Eric J. et al., Multi Octave Spectral Beam Combiner On Ultra-Broadband Photonic Integrated Circuit Platform, Optics Express, vol. 23, No. 9, pp. 11272-11283 (2015).

* cited by examiner

WAVELENGTH OPTIMIZATION FOR UNDERWATER OPTICAL COMMUNICATIONS

This application is a continuation-in-part of U.S. patent application Ser. No. 14/870,480, filed Sep. 30, 2015 by Burton H. Neuner III et al., for an invention entitled "Wavelength Optimization for Free-Space Optical Communications". The '480 application is hereby incorporated by reference herein.

FEDERALLY SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil, referencing NC 103749.

FIELD OF THE INVENTION

The present invention pertains generally to spectroscopy systems and methods. More specifically, this invention pertains to spectroscopy systems that can combine multiple optical beams into a single beam, and that can continuously monitor the environment. The present invention is particularly, but not exclusively, useful as a spectroscopy system and method that can select and illuminate an optimum optical beam for wireless optical communications, given the present environmental conditions.

BACKGROUND OF THE INVENTION

Electromagnetic radiation is employed for many types of wireless data communication, which can include radio frequency (RF), microwave, infrared, and visible spectral bands. This present disclosure can describe new methods and techniques of spectroscopically probing various media and optimizing wireless electromagnetic communication, particularly wireless communication in underwater environments.

When an electromagnetic beam encounters a material, it can interact with it in several different ways. These interactions can depend on the wavelength of the electromagnetic wave and the nature of the material. One particular case can be presented, that of visible light propagation. Photons (electromagnetic radiation) can interact with a medium in some combination of reflection, absorption and transmission. Some materials, such as glass or purified water, transmit much of the light incident upon them and reflect very little of it; such materials are called optically transparent. Many other solids and liquids are also highly transparent. Another factor affecting the optical properties of materials is scattering. In this process, photon energy remains largely unchanged but the trajectory is redirected along another path, and the detector no longer observes this radiation. The process of absorption occurs when photon energy is converted into another form (e.g., heat), and the photons are no longer observable by the system.

In the prior art, there can exist numerous products to analyze attenuation. In the specific case of visible radiation in a seawater medium, the ac-s In-Situ Spectrophotometer manufactured by WET LABS® can use a lamp source and a detector separated by a fixed, permanent distance. The Eco BB9 scattering meter made by WET LABS® is compact, and it can use multiple LED sources to characterize the water, but it only measures backscattering alone at one fixed angle to deduce particle concentration. These devices are not known to be capable of lock-in techniques that enable sensitive detection, nor do they permit high-speed communication.

Non-self-contained, two-sided optical communication links in the prior art do not typically contain retro-reflectors. Instead, such systems usually have a transmitter at one end and a receiver at the other end. In other prior art systems, light that is backscattered from turbid seawater can be extinguished by using crossed polarizing optical elements, but the prior art systems of this type can only use one laser, and cannot adapt to changing environments. Additionally, the light is directed through a small hole in a metal mirror, and return light reflects from the same mirror. A major drawback of this mirror-hole method is that some desired light may leak back through the initial hole, reducing the accuracy of the measurement.

In view of the above, it can be an object of the present invention to provide a wavelength optimization system and methods for underwater optical communication that can analyze underwater conditions to determine an optimum wavelength for optical communications. Another object of the present invention can be to provide a wavelength optimization system for underwater optical communication that can continuously monitor attenuation losses due to absorption and scattering in the environment. Still another object of the present invention can be to provide a wavelength optimization system for underwater optical communication that can switch communication wavelengths if changing environmental conditions warrant doing so. Yet another object of the present invention can be to provide a wavelength optimization system for underwater optical communication that can be relatively easy to manufacture and use in a cost-effective manner.

SUMMARY OF THE INVENTION

For the present invention according to several embodiments, spectroscopy systems and methods for wavelength optimization for underwater optical communication can include a plurality of n lasers having different wavelengths $\lambda_i$ for i=1 to n, a beam splitter and a corner retro-reflector. The plurality of n lasers and beam splitter can be isolated from the environment, while the corner retro-reflector can be placed in the environment and spaced apart from the beam splitter. The plurality of n lasers can simultaneously illuminate the beam splitter along a coincident axis.

The systems and methods can further include a means for selectively blocking the plurality of n lasers so that only one laser from the plurality of n lasers at wavelength $\lambda_i$ impinges on the beam splitter. A portion of the one laser that is unblocked passes through the beam splitter to establish a reference signal, while the remainder can be reflected off of the corner retro-reflector. The outgoing laser illumination can be polarized in a first plane, while the return illumination can be polarized in a second plane that is perpendicular to the first plane. A portion of the return illumination passes through the beam splitter to establish a return signal. The process can be repeated for each of the plurality of n lasers at $\lambda_i$ wavelengths, for i=1 to n. The $\lambda_i$ wavelength where the differential between the reference signal and the return signal is the minimum can be deemed as the optimum communication wavelength.

BRIEF DESCRIPTION OF THE DRAWINGS

The novel features of the present invention will be best understood from the accompanying drawings, taken in con

DETAILED DESCRIPTION OF THE EMBODIMENTS

Figure 1:
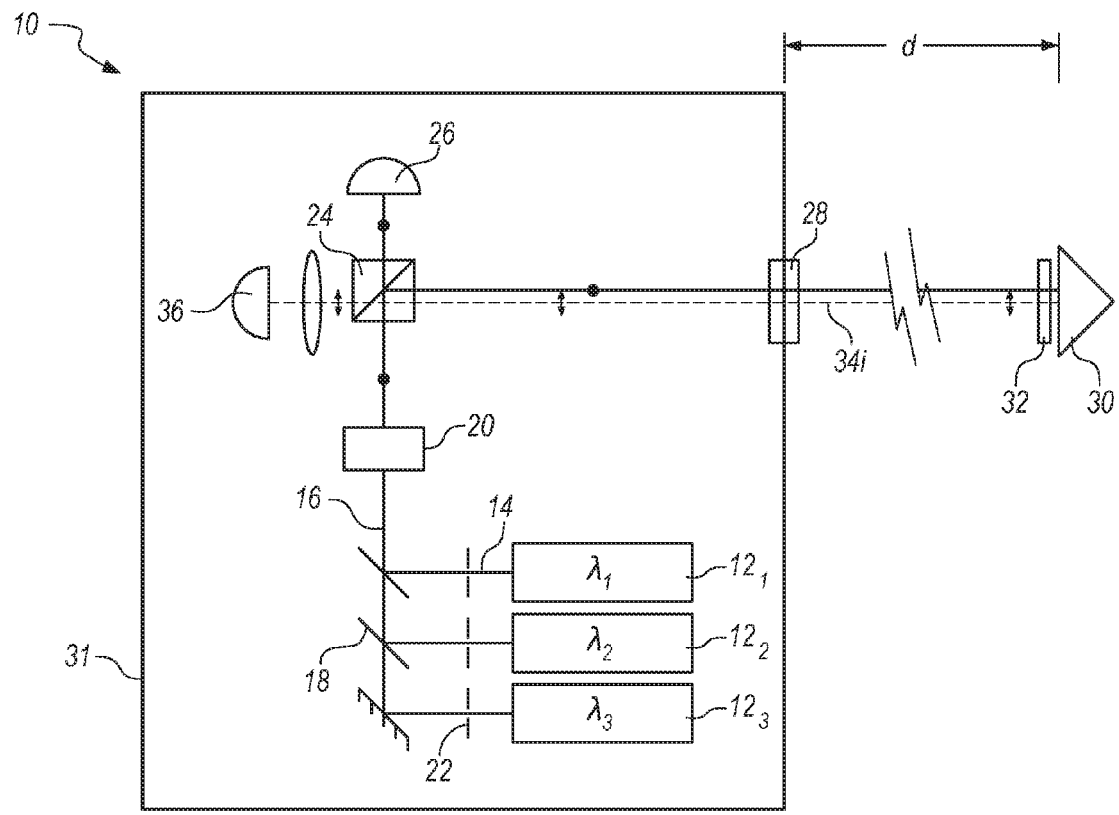
- FIG. 1 is a block diagram of the wavelength optimization system of the present invention according to several embodiments.
Figure 2:
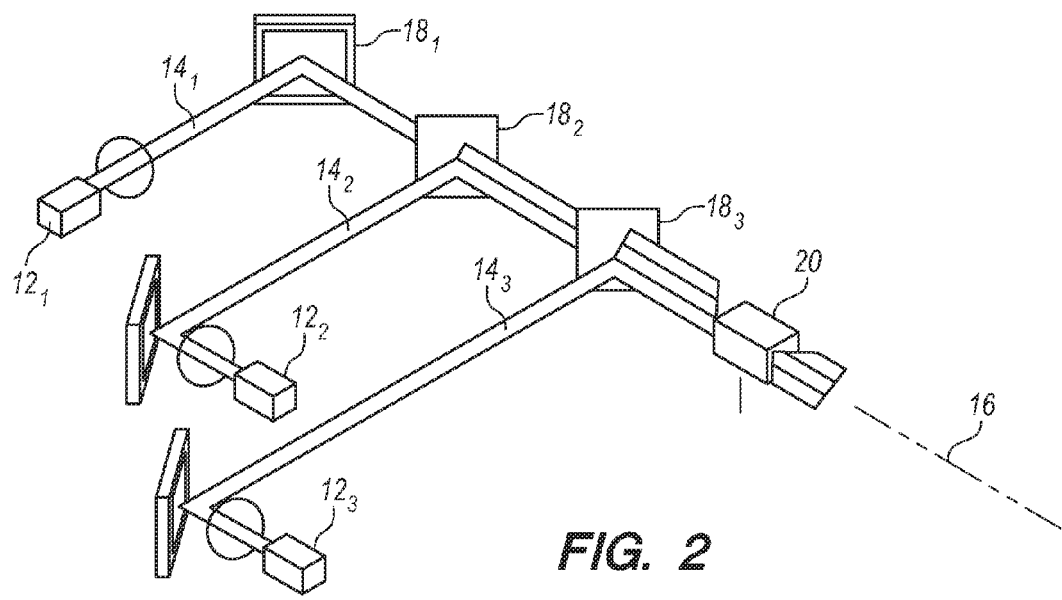
FIG. 2 is a side elevational view of the laser generation portions of the system of FIG. 1.

Referring initially to FIGS. 1-2, a system for environmental spectroscopy and wavelength optimization can be shown and can be generally designated by reference character 10. As shown, system 10 can include an array of n lasers $12_i$, of which representative lasers $12_1$, $12_2$ and $12_3$ are shown in FIG. 1. Each laser $12_i$, can have a corresponding wavelength $\lambda_i$, which can be different from the other wavelengths $\lambda_i$ for lasers 12. Wavelength $\lambda_i$ can be in the blue-green portion of the visible spectrum (from approximately 475-550 nm) although other wavelengths are certainly possible for the present invention.

Each of the lasers 12 can generate a respective beam 14, as shown in FIG. 1. For the present invention, the plurality of lasers 12 can be manipulated to illuminate beams 14 along a coincident axis 16. To do this, the present invention according to several embodiments can include a plurality of dichroic mirrors 18, with each dichroic mirror corresponding to a respective laser 12 and beam 14. For example, and as shown in FIG. 2, an array of lasers $12_1$, $12_2$ ... $12_n$ can transmit beams $14_1$, $14_2$ ... $14_n$ along different wavelengths ($\lambda_1$, $\lambda_2$, ... $\lambda_n$) covering the spectral range of interest (ultraviolet, visible, infrared, etc.). The beams 14 can be reflected off of dichroic mirrors 18, which reflect certain wavelengths, but allow other wavelengths to pass therethrough. Such an arrangement is shown in FIG. 2.

For the present invention, and referring again to FIGS. 1 and 2, system 10 can further include a wideband electro-optic modulator (EOM) 20. EOM 20 can function to modulate the beams 14, to allow for detection of the beams 14 by the electronics of the present invention. Presently, EOMs have small input apertures (e.g., 2 mm in diameter), which can necessitate tightly aligned and combined beams. The use of a single EOM 20, which can be aligned along coincident axis 16, can allow for lower costs, smaller package sizes, and reduced power consumption for system 10, all of which can be optimum for the systems and methods of the present invention.

The systems and methods of the present invention can further a plurality of shutters 22, with each shutter $22_i$ corresponding to a respective laser $12_i$, for i=1 to n. The shutters 22 can be operated to block each radiation source (e.g., visible laser 12) so that only one laser $12_i$ is illuminating along coincident axis 16 at any given time. The broadband EOM 20 can function optimally when modulating a single source wavelength at a time. With this configuration, all lasers 12 can remain activated, in the ideal, stable "on-state". But by employing shutters 22 to block all but one laser beam 14 at a time, a single beam $14_i$ can be directed through the EOM 20.

Figure 3:
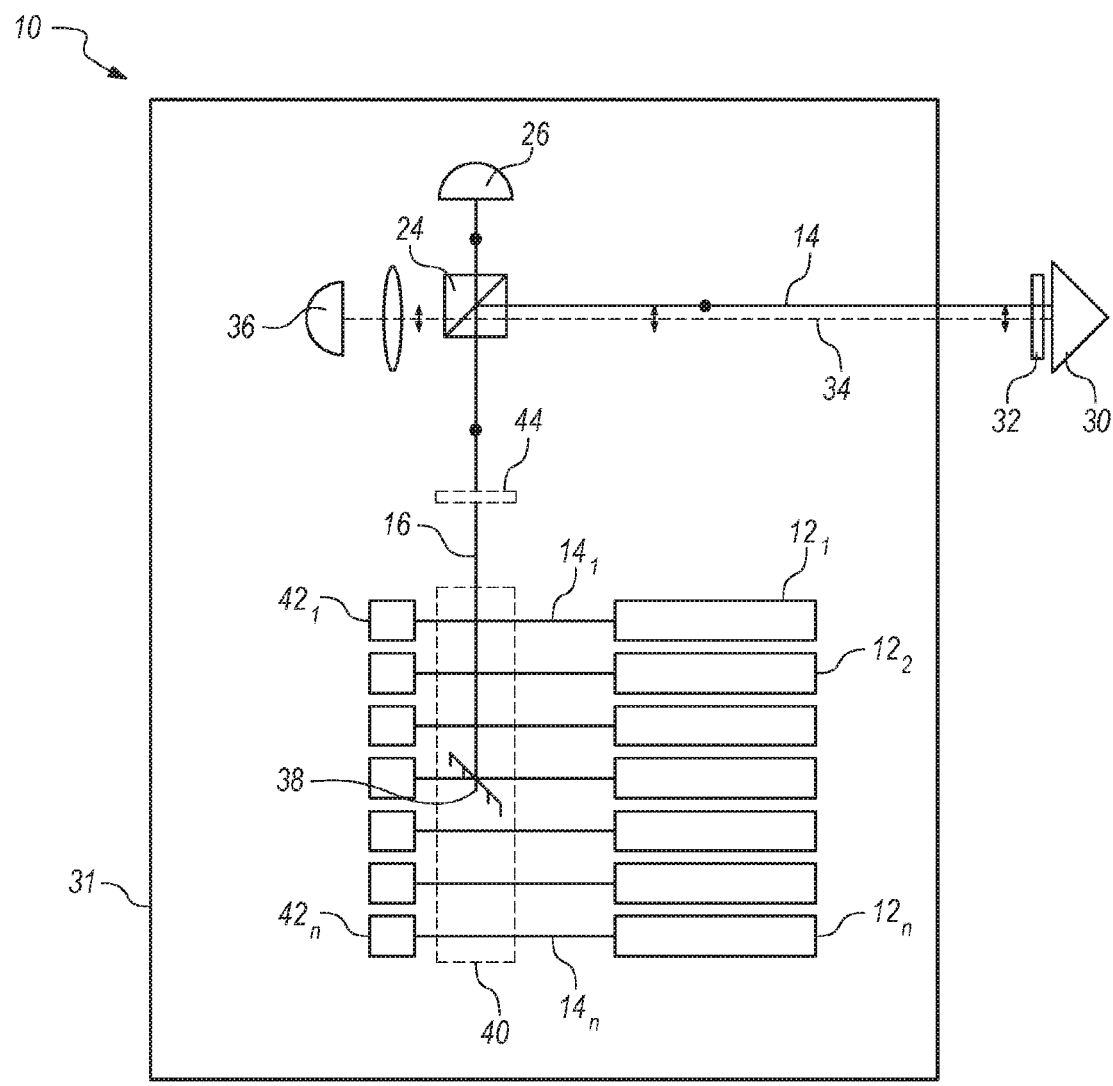
FIG. 3 is a block diagram of an alternative embodiment of the system of FIG. 1; and, FIG. 4 is a block diagram, which illustrates steps that can be taken to accomplish the methods of the present invention according to several embodiments.

As shown in FIGS. 1 and 3, the system 10 of the present invention according to several embodiments can further include a polarizing beam splitter 24. For several embodiments, beam splitter 24 can be positioned along coincident axis 16 so that beam 14 impinges on beam splitter 24. However, beam splitter 24 can be intentionally slight misaligned. The slight misalignment of beam splitter 24 can cause a portion of beam 14, which would normally be completely polarized in a given plane (for example, the vertical plane) and completely reflected off of beam splitter 24, to pass through beam splitter 24 instead. The portion of beam 14 which can pass through (a very small fraction of light) can impinge on reference photodiode 26 so that real-time normalization can occur (the process of dividing the return signal light from the original incident light).

Reference photodiode 26 can receive the above-reference portion of beam 14 and can output a voltage in response. The photodiode 26 voltage can be converted into a reference decibel (dB) value using a normalization algorithm (which can be accomplished by a microprocessor, not shown). The reference signal can be calibrated, ensuring that if no absorption or scattering (i.e., total attenuation) is observed for a given wavelength, then the system output will record 1.0 (or 100%) transmission. Likewise, if half of the light is lost to attenuation, the calibrated signal and reference photodiodes will be used to produce a datum of 0.5 (or 50%). The manner in which the normalization and calibration can occur is described more fully in a paper by Burton Neuner III et al., entitled "Wavelength Optimization Via Retroreflection for Underwater Free-Space Optical Communication". The contents of this Neuner III et al. paper are hereby incorporated herein by reference.

Lasers 12, beam 14, beam splitter 24 and reference photodiode 26 are all located within an enclosure 31 that is isolated from the environment under spectroscopy. The isolation from the from the environment can allow for a more correct reference signal when compared to a return signal from a beam which has pass through the environment under spectroscopy, as described more fully below.

After reflecting off of beam splitter 24, beam $14_i$ can pass through laser window 28 and can impinge on corner cube retro-reflector 30, which can be spaced apart from enclosure 31 by a distance "d". Distance "d" can be approximately equal to the distance at which the underwater free space optical (FSO) communications will occur. If the system 10 is characterizing the environment through a transmission measurement, then blocking backscattering can become critical. To block backscatter, the beam splitter 24 can direct vertically polarized light out of the laser window and into the environment (air, water, etc.). The corner-cube retro-reflector (CCR) 30 and broadband quarter-wave plate 32 can rotate polarization of beam $14_i$ by 90 degrees, so that a return beam 34 can be polarized in a plane that is perpendicular to the polarization of beam $14_i$ i.e. if beam $14_i$ can be horizontally polarized, return beam $34_i$ can be vertically polarized, and vice versa. Horizontal polarized return beam $34_i$ can be reflected through the environment under spectroscopy, through laser window 28 and impinge on the same beam splitter 24 within enclosure 31.

The perpendicularly polarized return beam $34_i$ can pass through the beam splitter 24 and can illuminate the reference signal photodiode 36. In response, the reference signal photodiode can output a voltage that can be indicative of return beam $34_i$. The beam hitting signal photodiode 36 can be normalized in the same as for reference diode 26 to establish a return signal in dB for the return beam $34_i$, and further establish a differential $D_i$ between return beam $34_i$ and given beam $14_i$ at wavelength $\lambda_i$. If the process is repeated for a different laser $12_j$ at wavelength $\lambda_j$, the differential $D_j$ can again be determined, and then compared to the differential $D_i$ for wavelength $\lambda_i$. If the differential $D_i$ is less than $D_j$, then wavelength $\lambda_i$ remains the optimum wavelength for transmission. But if $D_j$ is less than $D_i$, $\lambda_j$ can be deemed to be the new optimal wavelength for transmission, and system 10 can switch to this laser $12_j$ transmitting at this wavelength.

The process can be repeated for $\lambda_i$, for i=1 to n, which can result in a system 10 that can continually monitor the changing environment, and which can switch to a new optimum wavelength if environmental conditions warrant such a switch. Only light reflecting from the CCR 30 can be collected; other scattered and undesired light will be directed elsewhere. The CCR 30 can be extended from enclosure 31 at distance "d" by a mechanical arm, or the CCR 30 could be affixed to another stationary or moving platform.

A wide variety of scanning and reflecting devices can be used, which may include rotating mirrors, piezoelectric actuators, and translation stages. For example, in an alternative configuration, the single modulator could be replaced by multiple individual modulators assigned to each light source. The sources would then be combined using dichroic mirrors (or similar) into a single beamline and then directed to the output window for measurements or communications. This version could resemble a multiplexed source and could be used for higher data rate communication or rapid environmental monitoring.

Referring now to FIG. 3, an exemplary alternative embodiment of the present invention can be seen. As illustrated in FIG. 3, a single reflection mirror 38 atop a translation stage 40 can be included within enclosure 31. Translation stage 40 can move reflection mirror 38 in an axis coincident with coincident axis 16 (and perpendicular to respective beams 14) so that when reflection mirror 38 is within the beam path of a given beam $14_i$, that beam $14_i$ can be reflected off of reflection mirror 38 and onto beam splitter 24. The alternative embodiments can further include a beam dump 42 (or a plurality of beam dumps $42_i$, each of which would correspond to a laser $12_i$) to receive the lasers 12 that are not being reflected by mirror 38 (as with the previous embodiment, all lasers 12 can be continually illuminated).

Additionally, when performing environmental sensing, a mechanical chopper 44 can be placed coincident with coincident axis 16 to modulate the beam $14_i$. Chopper 44 can be used in lieu of EOM 20 to modulate the laser $14_i$ when lower costs and lower power demands are required. However, digital lock-in accuracy could be compromised, and additional components for modulated communication (e.g., acoustic or electro-optic modulators) might be necessary.

For several embodiments, the plurality of n lasers 12 can have different wavelengths $\lambda_i$ in the blue-green portion of the visible spectrum. It should be appreciated, however, that system 10 of the present invention can be spectral-band-flexible, and need not be specific to any particular medium of spectroscopy. Therefore, the system housing can be designed to accommodate high- or low-pressure gases or fluids, and key optical elements (including sources, modulators, polarizers, mirrors, detectors), can be selected as the application requires.

If the system will be used underwater, biofouling can occur. To prevent biofouling optical window 28 can be treated with thin film coatings to prevent biological accumulation, and a physical wiper (not shown in the Figures) could be installed adjacent to the window 28 to mechanically wipe clean the surface at periodic intervals. If the system 10 will be used in the atmosphere, similar moisture (for example, due to condensation) and particulate matter accumulation can also occur. The optical window 28 can similarly be treated with appropriate thin film coatings to prevent such fouling, with coating being tailored to the environment in which system 10 is being operated.

The proposed system 10 can cover a wide spectrum, from ultraviolet (UV) to near infrared (NIR), and can easy be configured to match future requirements and developments, e.g., to extend the electromagnetic coverage from extreme ultraviolet (EUV) and soft x-rays, down to lower energies corresponding to far IR and terahertz radiation. Thus, the system can spectroscopically characterize the environment in a wide range of bands, as needed, and can similarly transmit data at high speeds and with minimized loss.

The systems and methods of the present invention can provide certain advantages, in that no moving parts (scanning stages, choppers, actuators) are required for critical, precise components, which include the modulation technique and the detectors. For the embodiments illustrated in FIG. 1, small, mechanical shutters 22 can be included in the design, as they simply block and unblock the continuous-wave beams, they do not require precise alignment, and they are compact and consume a minimum of power. Employing amplitude-based EOMs or phase-based EOMs can give the user full control of the beam's amplitude, phase, and polarization properties, as needed.

To compensate for air or water turbulence, an adaptive optics subsystem could be used. This device typically employs a deformable mirror that compensates for beam wander or scintillation that would otherwise not be accounted for in the attenuation calculation. Without adaptive optics, attenuation in a highly scattering or turbulent environment could be overestimated. The end-user requirements could drive the need for such subsystems.

Figure 4:
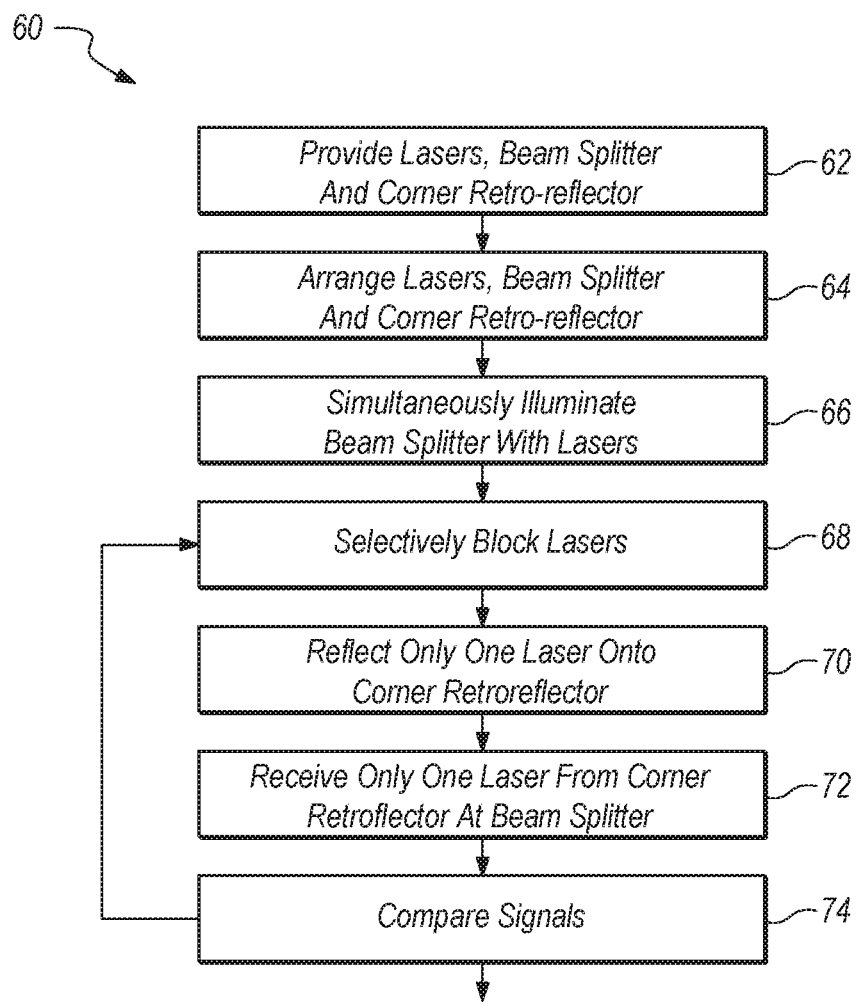

Referring now to FIG. 4, a block diagram 60 is shown, which can refer to steps that can be taken to practice the methods of the present invention according to several embodiments. As shown, methods 60 can include the step 62 of providing a plurality of lasers 12, a beam splitter 24 and a corner retro-reflector 30. The structure and cooperation of structure of lasers 12, beam splitter 24 and CCR 30 can be as described above. The methods can further include the step (depicted by block 64) of arranging the lasers 12 beam splitter 24 and CCR 30, so that beams 14 radiate along a coincident axis 16 and impinge on beam splitter 24, and further so that lasers 14 reflect off of beam splitter 24 out of enclosure 31 and impinge on CCR 30, and so the return beam 34 reflects off of CCR 30 and impinges on beam splitter 24, also as described above.

The methods according to several embodiments can further include the steps 66, 68 of selectively blocking the lasers 12, so that only one beam 14 impinges on beam splitter 24 at any given time. As shown by step 72, the methods can include the step of receiving return beam 34 from CCR 30 at beam splitter 24. The methods can further include the step 74 of comparing the reference signal from photodiode 26 with the return signal from signal photodiode 36 (keeping in mind that both signals have been normalized to allow for such a comparison), to establish a differential D. Steps 68 through 74 can then be continually repeated for each laser $12_i$ at wavelength $\lambda_i$. For each cycle of steps 68 through 74, if the differential from the comparison step 74 is less the differential resulting from that of the previous step, then the wavelength corresponding to that laser can be deemed as the new optimum wavelength for transmission.

For example, if the accomplishment of steps 68-74 for laser $12_1$ in FIG. 1 results in a differential $D_1$, and the accomplishment of steps 68-74 for laser $12_2$ results in a differential $D_2$, and $D_1<D_2$, then laser $12_1$ can be deemed the optimum laser and wavelength $\lambda_1$ can be deemed as the optimum wavelength for optical communications. Still further, upon repetition, if the accomplishment of steps 68-74 for laser $12_3$ results in a differential $D_3$, and $D_1<D_3$, then laser $12_1$ remains the optimum laser and wavelength $\lambda_1$ remains the optimum wavelength. However, if $D_3<D_1$, then laser $12_3$ can be deemed as the new optimum laser and wavelength $\lambda_3$ can be deemed as the new optimum wavelength for optical communications.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for accomplishing spectroscopy of an environment, said method comprising the steps of:
   A) providing a plurality of n lasers having different wavelengths $\lambda_i$ for i=1 to n, a beam splitter and a corner retro-reflector;
   B) arranging said plurality of n lasers, said beam splitter and said corner retro-reflector so that said beam splitter and said plurality of n lasers are isolated from said environment, and so that said retro-reflector is spaced apart from said beam splitter and in said environment;
   C) simultaneously illuminating said plurality of n lasers along a coincident axis;
   D) selectively blocking said plurality of n lasers so that only one laser of said plurality of n lasers at wavelength $\lambda_i$ impinges on said beam splitter, said beam splitter allowing a portion of said only one laser at wavelength $\lambda_i$ to pass therethrough to establish a reference signal;
   E) reflecting said only one laser at wavelength $\lambda_i$ off said beam splitter and onto said corner retro-reflector; and,
   F) receiving said only one laser at wavelength $\lambda_i$ from said corner retro-reflector at said beam splitter, said beam splitter allowing a portion of said laser at wavelength $\lambda_i$ to pass therethrough to establish a return signal.

2. The method of claim 1, wherein said step D) is accomplished with said laser at wavelength $\lambda_i$ light that is polarized in a first plane and said step F) is accomplished with said laser at wavelength $\lambda_i$ polarized in a second plane that is perpendicular to said first plane.

3. The method of claim 2, wherein said steps D) through F) are repeated for i=1 to n.

4. The method of claim 1, wherein said wavelength $\lambda_i$ is in the blue green portion of the visible spectrum.

5. The method of claim 1, wherein said step D) is accomplished by a translation stage and a plurality of n beam dumps, each of said n beam dumps corresponding to plurality of said lasers.

6. The method of claim 1, wherein said step D) is accomplished by a plurality of n dichroic mirrors and a plurality of n shutters corresponding to said plurality of n lasers.

7. The method of claim 1, wherein said step B) is accomplished so that said corner retro-reflector is spaced apart from said beam splitter by a distance d that is substantially equal to a desired range of free space optical (FSO) communications.

8. A method for optimizing wireless optical communications in an environment, said method comprising the steps of:
   A) providing a plurality of n lasers having different wavelengths $\lambda_i$ for i=1 to n, a beam splitter and a corner retro-reflector;
   B) arranging said plurality of n lasers, said beam splitter and said corner retro-reflector so that said beam splitter and said plurality of n lasers are at a transmitting station and isolated from said environment, and so that said retro-reflector is proximate a receiving location and spaced apart from said beam splitter and in said environment;
   C) simultaneously illuminating said plurality of n lasers along a coincident axis;
   D) selectively blocking said plurality of n lasers so that only one laser of said plurality of n lasers at wavelength $\lambda_i$ impinges on said beam splitter, said beam splitter allowing a portion of said only one laser at wavelength $\lambda_i$ to pass therethrough to establish a reference signal;
   E) reflecting said only one laser at wavelength $\lambda_i$ off said beam splitter and onto said corner retro-reflector;
   F) receiving said only one laser at wavelength $\lambda_i$ from said corner retro-reflector at said beam splitter, said beam splitter allowing a portion of said laser at wavelength $\lambda_i$ to pass therethrough to establish a return signal; and,
   G) comparing said return signal to said reference signal to establish a differential.

9. The method of claim 8, wherein said step D) is accomplished with said laser at wavelength $\lambda_i$ light that is polarized in a first plane and said step F) is accomplished with said laser at wavelength $\lambda_i$ polarized in a second plane that is perpendicular to said first plane.

10. The method of claim 9, wherein said steps D) through F) are repeated for i=1 to n.

11. The method of claim 10, further comprising the step of:

H) selecting a said wavelength $\lambda_i$ as a communication wavelength when said differential for said wavelength $\lambda_i$ is less than the said differential from the previous accomplishment of said steps D) through F).

12. The method of claim 11, wherein said steps D) through H) are continually repeated, and wherein accomplishment of said step H) results in a different said communication wavelength based on changing conditions in said environment.

13. The method of claim 8, wherein said wavelength $\lambda_i$ is in the blue green portion of the visible spectrum.

14. The method of claim 8, wherein said step D) is accomplished by a translation stage and a plurality of n beam dumps, each of said n beam dumps corresponding to plurality of said lasers.

15. The method of claim 8, wherein said step D) is accomplished by a plurality of n dichroic mirrors and a plurality of n shutters corresponding to said plurality of n lasers.

16. The method of claim 8, wherein said step B) is accomplished so that said corner retro-reflector is spaced apart from said beam splitter by a distance d that is substantially equal to a desired range of wireless optical communications.

17. An optical communications optimization system for an environment, comprising:
 a plurality of n lasers illuminating a plurality of n different transmission wavelengths $\lambda_i$;
 a beam splitter, said plurality of n lasers illuminating along a coincident axis onto said beam splitter, said beam splitter allowing a portion of said laser to pass through to establish a reference signal, said beam splitter and said plurality of n lasers being isolated from said environment;
 a means for selectively blocking said plurality of n lasers so that only one laser of said plurality of n lasers at wavelength $\lambda_i$ impinges on said beam splitter at a time, said beam splitter allowing a portion of said only one laser at wavelength $\lambda_i$ to pass therethrough to establish a reference signal;
 a retro-reflector spaced apart from beam splitter and located in said environment, said retro-reflector receiving said laser illumination from said beam splitter and reflecting said illuminations back onto said beam splitter as a return illumination; and,
 said beam splitter allowing a portion of said return illumination to pass therethrough as a return signal.

18. The system of claim 17 wherein said laser illumination received at said corner retro-reflector from said beam splitter is polarized in a first plane, and said return illumination is polarized in a second plane that is perpendicular to said first plane.

19. The system of claim 17, wherein said selective blocking means further comprises:
 a microprocessor, said microprocessor containing non-transitory written instructions to selectively block said plurality of n lasers at wavelength $\lambda_i$ so that each of said plurality of n lasers functions as said only one laser at wavelength $\lambda_i$ on a rotating basis
 said microprocessor further comparing said reference signal to said return signal to establish a differential, and selecting said only one laser at wavelength $\lambda_i$ as said transmission wavelength when said differential is at a minimum.

20. The system of claim 17, wherein said wavelength $\lambda_i$ is in the blue green portion of the visible spectrum.

* * * * *